United States Patent [19]

Maus et al.

[11] Patent Number: 5,328,774
[45] Date of Patent: Jul. 12, 1994

[54] MONOLITHIC METAL HONEYCOMB BODY WITH VARYING NUMBER OF CHANNELS

[75] Inventors: Wolfgang Maus; Helmut Swars, both of Bergisch Gladbach, Fed. Rep. of Germany

[73] Assignee: Emitec Gesellschaft für Emissionstechnologie mbH, Lohmar, Fed. Rep. of Germany

[21] Appl. No.: 27,735

[22] Filed: Feb. 5, 1993

Related U.S. Application Data

[63] Continuation of PCT/EP91/01389, Jul. 24, 1991.

[30] Foreign Application Priority Data

Aug. 6, 1990 [DE]  Fed. Rep. of Germany ....... 4024942

[51] Int. Cl.⁵ ........................... B01J 35/04; F01N 3/28
[52] U.S. Cl. ................... 428/593; 502/439; 502/527; 422/180
[58] Field of Search ............... 428/592, 593; 502/439, 502/527; 422/180

[56] References Cited

U.S. PATENT DOCUMENTS

| | | | |
|---|---|---|---|
| 3,785,781 | 1/1974 | Hervert et al. | 423/212 |
| 4,713,361 | 12/1987 | Maus | 502/2 |
| 4,818,746 | 4/1989 | Cyrou | 502/527 |
| 4,988,483 | 1/1991 | Usvi et al. | 422/180 |
| 5,146,743 | 9/1992 | Maus et al. | 422/174 |
| 5,153,167 | 10/1992 | Saito et al. | 502/439 |
| 5,157,010 | 10/1992 | Maus et al. | 502/439 |
| 5,173,267 | 12/1992 | Maus et al. | 422/180 |

FOREIGN PATENT DOCUMENTS

| | | |
|---|---|---|
| 0152560 | 11/1984 | European Pat. Off. . |
| 0153157 | 8/1985 | European Pat. Off. . |
| 0186801 | 12/1985 | European Pat. Off. . |
| 0121175 | 1/1987 | European Pat. Off. . |
| 0245737B1 | 11/1987 | European Pat. Off. . |
| 0321761 | 6/1989 | European Pat. Off. . |
| 0245737A1 | 8/1989 | European Pat. Off. . |
| 0245738 | 8/1989 | European Pat. Off. . |
| 0332891 | 9/1989 | European Pat. Off. . |
| 2542282 | 3/1977 | Fed. Rep. of Germany . |
| 2554359 | 6/1977 | Fed. Rep. of Germany . |
| 2902779 | 7/1980 | Fed. Rep. of Germany . |
| 3534904 | 4/1987 | Fed. Rep. of Germany . |
| 3601011 | 7/1987 | Fed. Rep. of Germany . |
| 3743503 | 7/1989 | Fed. Rep. of Germany . |
| 8909128 | 7/1989 | Fed. Rep. of Germany . |
| 3809105 | 9/1989 | Fed. Rep. of Germany . |
| 8908738 | 10/1989 | Fed. Rep. of Germany . |
| 3817490 | 11/1989 | Fed. Rep. of Germany . |
| 3922266 | 2/1990 | Fed. Rep. of Germany . |
| 8914489 | 4/1990 | Fed. Rep. of Germany . |
| 8900467 | 6/1990 | Fed. Rep. of Germany . |
| 3910359 | 10/1990 | Fed. Rep. of Germany . |
| 62-273049 | 11/1987 | Japan . |
| 63-18123 | 1/1988 | Japan . |
| 63-113112 | 5/1988 | Japan . |
| 1218637 | 8/1989 | Japan . |
| 4-161252 | 6/1992 | Japan .................................. 502/527 |
| 8907488 | 8/1989 | PCT Int'l Appl. . |
| 9003320 | 4/1990 | PCT Int'l Appl. . |
| 9004087 | 4/1990 | PCT Int'l Appl. . |

*Primary Examiner*—John Zimmerman
*Attorney, Agent, or Firm*—Herbert L. Lerner; Laurence A. Greenberg

[57] ABSTRACT

A honeycomb body includes leading and trailing end surfaces being mutually spaced apart in a given flow direction. Subsections are disposed in succession in the given flow direction between the end surfaces. At least some sheet-metal layers have structures forming channels therebetween extending approximately in the given flow direction through which a fluid can flow. The channels have dimensions determined by the structures of the sheet-metal layers. Each of the subsections has a different number of channels per unit of cross-sectional area and the channels have cross-sectional areas differing in each of the subsections. The sheet-metal layers include some layers being smooth or slightly structured in proportion to the dimensions of the channels, having spacings therebetween and extending from the leading to the trailing end surfaces giving the honeycomb body a monolithic form, and the sheet-metal layers include different numbers of other sheet-metal layers filling the spacings in each of the subsections.

26 Claims, 3 Drawing Sheets

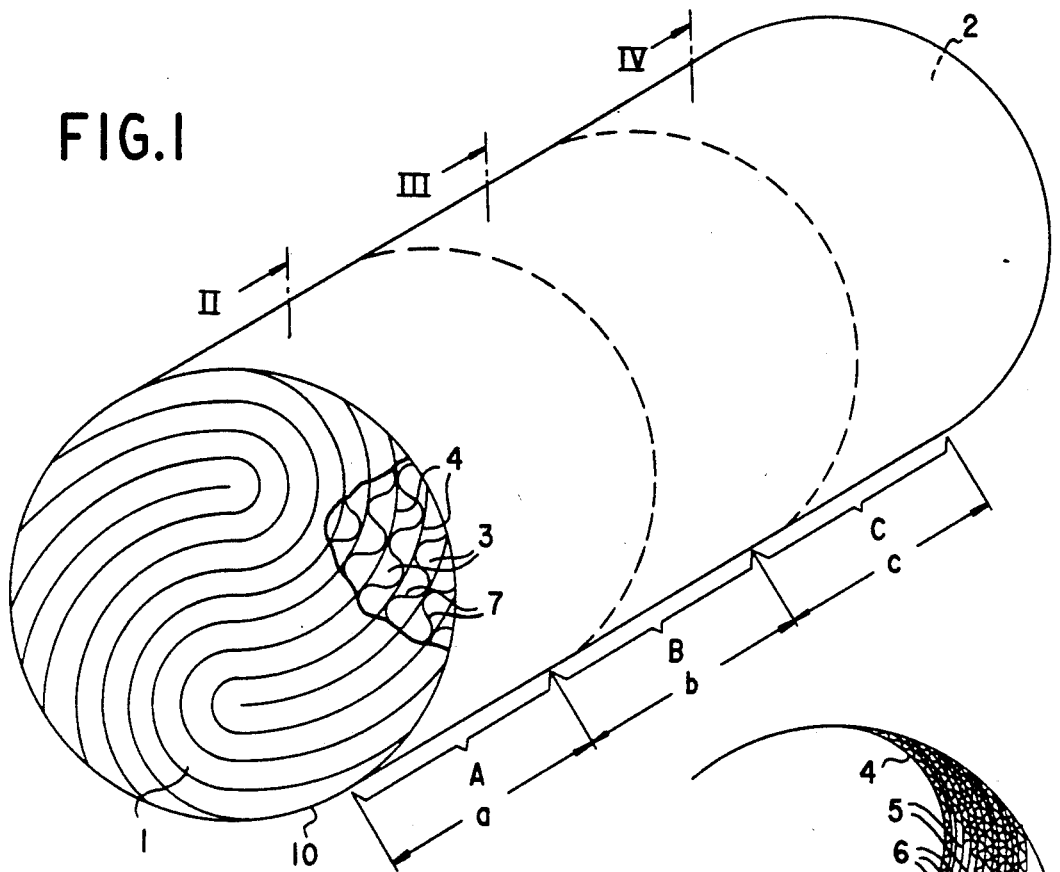

FIG.7
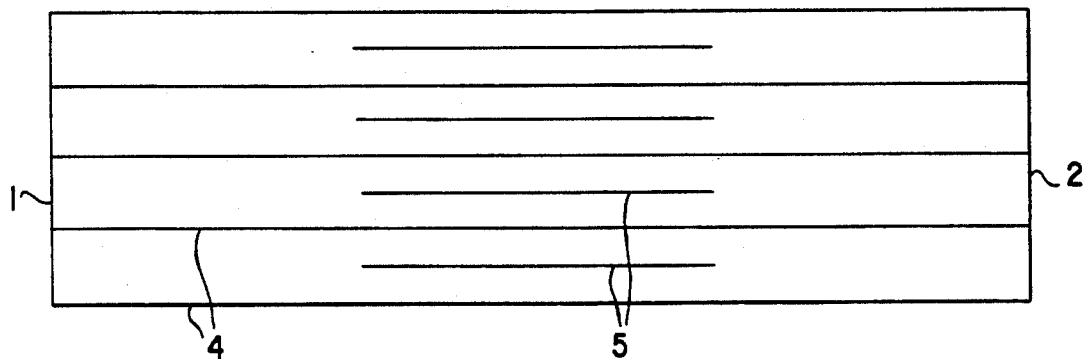
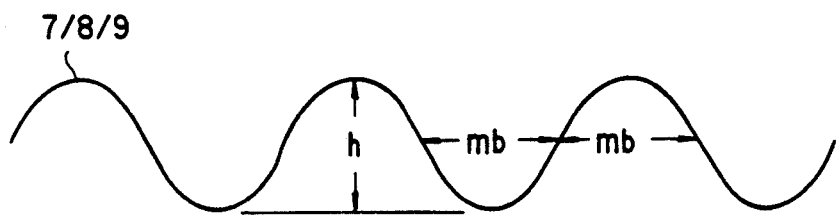
FIG.8

MONOLITHIC METAL HONEYCOMB BODY WITH VARYING NUMBER OF CHANNELS

CROSS-REFERENCE TO RELATED APPLICATION

This application is a continuation of International Application Ser. No. PCT/EP91/01389, filed Jul. 24, 1991.

The present invention relates to a monolithic metal honeycomb body, which is used particularly as a catalyst carrier body for cleaning exhaust gases in internal combustion engines.

BACKGROUND OF THE INVENTION

A number of versions of such honeycomb bodies are known, for instance from Published European Application No. 0 245 737 B1 corresponding to U.S. Pat. Nos. 4,923,109 and 4,832,998; Published European Application No. 0 245 738 B1, corresponding to U.S. Pat. Nos. 4,803,189 and 4,946,822; or Published International Application WO 90/03220, corresponding to U.S. Pat. No. 5,135,794.

It is also known that for the most effective possible exhaust gas cleaning, it can be appropriate to place a succession of disks in the flow direction, and that these disks may optionally also have a different honeycomb structure or size from one another. However, such a body is no longer monolithic and therefore its production, its installation in a jacket tube, and optionally its coating all involve greater effort and expense. Such bodies made of more than one disk are described in Published International Application WO 90/04087, corresponding to U.S. application Ser. No. 805,097, filed Dec. 10, 1991; or Published European Application No. 0 121 175 B1, for instance. It is also known from U.S. Pat. No. 3,785,781 to place such disks in succession without them being spaced apart from one another.

In order to improve the effectiveness and/or the flow conditions in a monolithic honeycomb body, it has also already been proposed to offset the individual channels from one another or to interrupt them by making various structural provisions, such as in Published European Application No. 0 186 801 A2, corresponding to U.S. Pat. No. 4,665,051; Published European Application No. 0 152 560 A1; or German Published, Non-Prosecuted Application DE 29 02 779 A1, corresponding to U.S. Pat. No. 4,273,681. That creates additional edges facing into the flow of exhaust gas, which can be advantageous for catalytic conversion. A similar effect can also be achieved by folding-over some of the channel walls in cuff-like fashion, as is described, for instance, in German Petty Patent No. DE-U 89 09 128, corresponding to U.S. Pat. No. 5,045,403.

A common feature of the monolithic honeycomb bodies which are constructed in that way is that they have the same number of sheet-metal layers in each cross-sectional region, so that the catalytically active surface area remains the same in each cross-sectional region even if a comparable effect with respect to the leading edges is achieved by means of different sheet-metal structures as compared to that achieved if the number of channels per unit of surface area is increased. However, the catalytically active surface area per cross-sectional region cannot be changed in that way.

In monolithic honeycomb bodies, which are preferably used for the sake of ease of manipulation and installation in an exhaust system, the catalytically active surface area in a first cross-sectional region in the prior art is therefore the same as the surface area after it, in each cross-sectional region in the flow direction. That only allows limited optimization of the conditions in a monolithic honeycomb body in terms of response behavior and resistance to thermal aging. If it is desired for the honeycomb body to reach an adequate temperature for catalytic conversion as soon as possible upon cold starting of the engine, for instance, then it should not have overly large dimensions in its first cross-sectional region, yet in monoliths that necessarily means that it must keep the same dimensions in each succeeding cross-sectional region as well, so that for complete conversion the body has to be undesirably long (low number of channels and therefore long channel length).

However, if the body is constructed with many channels and a short structural length, then on one hand it has an unfavorable cold starting performance under some circumstances, yet after attaining operating temperature it already converts by far the greatest part of the pollutants in the exhaust gas in exothermic reactions in a forward cross-sectional region, so that a maximum temperature occurs in the first subsection and leads to premature aging of the catalytically active coating. The high temperature is imparted by the flow to the succeeding layers as well, thereby causing them to age thermally also, even though they make only a small contribution to the catalytic conversion.

SUMMARY OF THE INVENTION

It is accordingly an object of the invention to provide a monolithic metal honeycomb body with a varying number of channels, or in other words with varying dimensions in the flow direction and with varyingly large catalytically active surfaces, which overcomes the hereinafore-mentioned disadvantages of the heretofore-known devices of this general type and which is readily adaptable to various usage conditions. In particular, it should be possible to advantageously vary the response performance, the thermal aging and the structural length simultaneously.

With the foregoing and other objects in view there is provided, in accordance with the invention, a honeycomb body, comprising leading and trailing end surfaces being mutually spaced apart in a given flow direction; subsections disposed in succession in the given flow direction between the end surfaces; sheet-metal layers at least some of which having structures forming channels therebetween extending approximately in the given flow direction through which a fluid can flow; the channels having dimensions determined by the structures of the sheet-metal layers; each of the subsections having a different number of the channels per unit of cross-sectional area and the channels having cross-sectional areas differing in each of the subsections; the sheet-metal layers including some layers being smooth or slightly structured in proportion to the dimensions of the channels, having spacings therebetween and extending from the leading to the trailing end surfaces giving the honeycomb body a monolithic form, and the sheet-metal layers including different numbers of other sheet-metal layers filling the spacings in each of the subsections.

A honeycomb body, if it is to be called a monolithic body, must be formed of a single block with internal cohesiveness. Such cohesiveness is preferably attained according to the invention by means of smooth sheet-metal layers, or sheet-metal layers that are slightly structured in proportion to the dimensions of the channels, with some of the sheet-metal layers in the honeycomb body extending continuously from the leading end to the trailing end of the body. These sheet-metal layers give the body its monolithic structure and its external form. The spacings between these sheet-metal layers in various subsections are filled with different numbers of sheet metal layers.

Substantial progress is achieved because the monolithic honeycomb body is made up of sheets having varying width and varyingly dimensioned structures, so that precisely the desired variation in the number of channels and in catalytically active surfaces is attainable. As can be seen from the aforementioned prior art, many different sheet structures and configurations of sheet-metal layers with which honeycomb bodies can be built up exist. The invention is applicable in principle to all of those forms, although that entails varying amounts of effort. One of the most frequent structures is the use of alternating layers of smooth and corrugated metal sheets. For various reasons, however, in some applications that basic structure has slight structures superimposed on it. For example, the smooth sheets may be provided with a microscopic corrugation with a short wavelength and low amplitude, or all of the sheets may be provided with a microstructure that extends transversly to the flow direction. In the ensuing description, the term "smooth sheet-metal layer" is understood to mean a sheet-metal layer having a structure which is small in proportion to the incident dimensions of the channels in the honeycomb body, for example being less than 20 percent of the largest dimension of the channels. In contrast, the term "high structure" is understood to mean a structure which is on the order of magnitude of the incident dimensions of the channels and is precisely responsible for forming the channels having those dimensions.

Since a honeycomb body can be built up of a number of individual sheets in the various structural forms, and alternatively, structural forms are also known in which the entire honeycomb body includes only one or two spirally wound or meanderingly layered sheets, the term "sheet-metal layers" will be used below and in the claims as a general term, but it is of no significance whether the individual sheet-metal layers are formed by one wound or folded sheet or by separate sheets.

In accordance with another feature of the invention, the honeycomb body is further subdivided by additional smooth sheet-metal layers, each of which extends over only a portion of the distance by which the ends are spaced apart. The additional sheet-metal layers and the structured sheets to be disposed between them precisely meet the requirement for accommodating more catalytically active service area and a larger number of channels in certain subsections of the honeycomb body.

In accordance with a further feature of the invention, the varying numbers of channels in different cross-sectional regions are obtained by using at least two types of different metal sheets, being highly structured approximately parallel to the flow direction, and the distances between the various smooth sheets are filled with highly structured sheets that form the boundaries of the channels.

In accordance with an added feature of the invention, the highly structured metal sheets are corrugated or bent in trapezoidal or zig-zag fashion in typical molds, having a varying structural height.

The smooth sheets extending all the way through the entire body have a layer spacing among one another that determines the highest existing structural height of the highly structured sheets. This structural height is subdivided by smooth intermediate sheets to be added, and in the simplest case it is divided into two equal distances but may also be divided into three or four such distances.

In accordance with an additional feature of the invention, the structural heights of sheets for filling these distances have a proportion to the first structural height of approximately 1:2, 1:3 or 1:4. In the precise proportion of the corrugation heights, the thickness of the smooth intermediate layers must also be taken into account. Normally, it is virtually negligibly small, because it is in the range of elastic deformability of the structured sheets. The numerical proportions given above must therefore be understood to apply only in an approximate sense.

In accordance with yet another feature of the invention, different numbers of channels are achieved by means of different, highly structured sheets of equal structural height, but varying structural width. In that case, however, the channel shapes are greatly changed, which may lead to unfavorable hydraulic cross sections.

In accordance with yet a further feature of the invention, a finer subdivision among continuous smooth sheet-metal layers is achieved by means of two or more sheet-metal layers that are obliquely corrugated in opposite directions and which rest on one another without a smooth intermediate layer between them. Between two smooth sheet-metal layers, there is then only one corrugated sheet-metal layer of high structural height in the first subsection of the honeycomb body, while in further subsections a plurality of sheet-metal layers that are corrugated obliquely in opposite directions can be built up by layering one upon another.

In the transitional regions between the individual subsections in a honeycomb body, unfavorable configurations may result from irregular overlaps in the channel walls of large and small channels. This can lead to obstructions, particularly when they are to be coated with a catalytically active composition later.

For this reason, in accordance with yet an added feature of the invention, the highly structured sheets, in at least one subsection of the honeycomb body, are narrower than the width of this subsection. This forms variously long compensation gaps between the differently structured sheet-metal layers in the transitional region, which is advantageous both for coating purposes and for later flow conditions in the body.

In accordance with yet an additional feature of the invention, in the case of normal applications, the honeycomb body is subdivided into two or three subsections. A first section should have approximately 50 to 100 cpsi (this is the typical symbol for the number of channels per square inch) and a second section should preferably have 200 to 500 cpsi. If necessary, another section with approximately 100 to 200 cpsi may be located between the first two.

In accordance with again another feature of the invention, in the case of most applications, the number of sheet-metal layers and of channels per unit of cross-sectional surface area increases in the flow direction. This leads to a favorable starting performance and at the same time lessens the damage from thermal aging.

In accordance with again a further feature of the invention, in combination with other provisions that decrease pollutants or with precatalysts, the body has a reverse configuration with a number of sheet-metal layers that decreases in the flow direction.

In accordance with again an added feature of the invention, the number of channels first increases and then decreases again in the flow direction. In this way, for instance, a honeycomb body can be made that is symmetrical in terms of its installation direction, so that mistakes in installing it cannot occur. Under some circumstances such configurations may also make for better exploitation of noise-abating properties of the honeycomb body.

In accordance with again an additional feature of the invention, the honeycomb body is built up from sheet-metal layers having an approximately S-shaped cross section, in a known manner. This is particularly favorable from the production standpoint and is advantageous for the sake of strength. This kind of honeycomb body can be produced by bending the ends of a sheet-metal stack in opposite directions. It is then easy for the stack to be built up with a different number of sheets in different subsections, in order to achieve the desired configuration. In accordance with still another feature of the invention, in general, alternatingly disposed smooth and corrugated sheets will be used for this purpose, with the corrugated sheets having two or more different corrugation heights and/or mean corrugation widths.

In such a stack, in principle it is also possible for the width of the smooth sheets that do not extend through the entire stack to be selected freely and individually in each intermediate layer. In this way, in accordance with a concomitant feature of the invention, the body has a boundary between each two subsections which extends not in a plane surface but rather in curved fashion, so that the various channels in a subsection are of different lengths. Such a configuration can also favorably affect the noise-abating properties of the honeycomb body and can also help counteract an unfavorable flow distribution across the cross section.

Other features which are considered as characteristic for the invention are set forth in the appended claims.

Although the invention is illustrated and described herein as embodied in a monolithic metal honeycomb body with a varying number of channels, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

FIG. 1 is a diagrammatic, perspective view of a honeycomb body according to the invention;

FIGS. 2, 3 and 4 are fragmentary, cross-sectional views taken along the lines II—II, III—III and IV—IV of FIGS. 1 and 5, in the direction of the arrows;

FIGS. 6 and 7 are other longitudinal-sectional views of modified honeycomb bodies; and FIG. 8 is an enlarged, end-elevational view of structured sheet-metal layers illustrating dimensional figures which are used.

DESCRIPTIONS OF THE PREFERRED EMBODIMENTS

Figure 5:
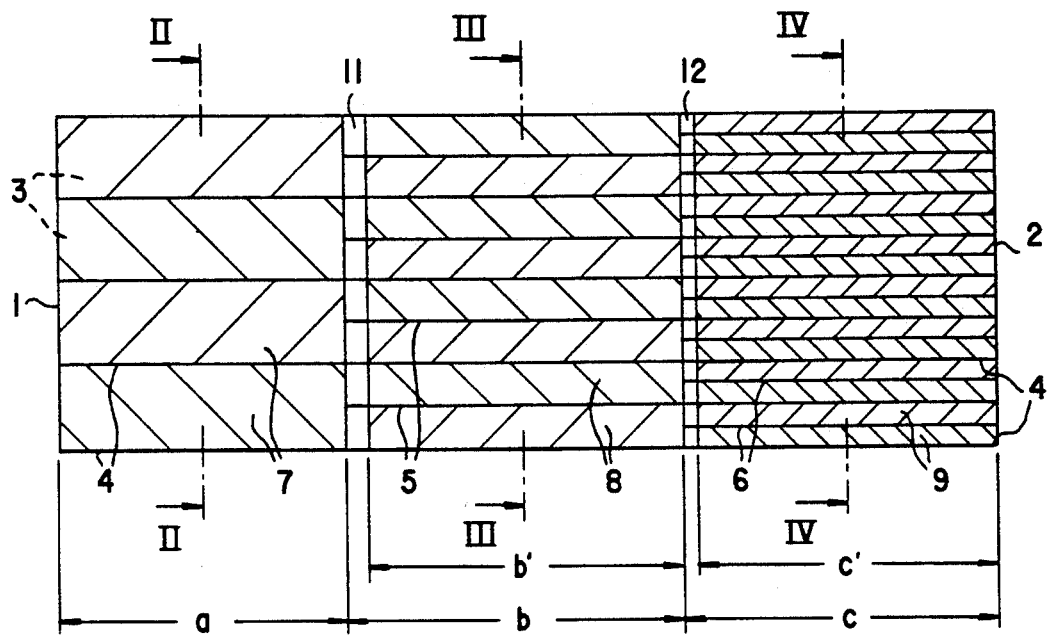
FIG. 5 is a longitudinal-sectional view of FIG. 1.

Referring now to the figures of the drawing in detail and first, particularly, to FIG. 1 thereof, there is seen a perspective view of a honeycomb body with a leading end surface 1 and a trailing end surface 2, as a special exemplary embodiment of the invention. The various cross sections shown in FIGS. 2, 3 and 4 also serve to explain the configuration of this body. The body is given its monolithic external form initially by smooth sheets 4, which extend through the entire body and through all of the cross sections. Each of these sheet-metal layers 4 extends in an S shape in the cross-sectional plane. First corrugated sheets or sheet-metal layers 7 are disposed between the sheet-metal layers 4 in a first subsection A. The corrugations of the corrugated sheets 7 determine the size of channels 3. The first subsection A is adjoined in the flow direction by a second subsection B, which differs from the subsection A in that additional smooth sheet-metal layers 5 are present between the smooth sheet-metal layers 4. Interstices between the smooth sheet-metal layers 4 and 5 are subdivided by second corrugated sheets 8. The second corrugated sheets 8 have approximately half the corrugation height of the first corrugated sheets 7, not counting the thickness of the smooth sheet-metal layers. In the subsection B, the honeycomb body has approximately twice the number of channels as in the subsection A.

In addition to the smooth sheet-metal layers 4, 5, smooth sheet-metal layers 6 also extend in a third subsection C, and remaining interstices are subdivided by third corrugated sheet-metal layers 9, which again correspondingly have half the corrugation height of the corrugated sheets 8 of the subsection B. The lengths of the subsections A, B and C are given respective reference symbols a, b and c. A honeycomb body of this kind can therefore have a channel density of 100 cpsi in the subsection A, 200 cpsi in the subsection B, and 400 cpsi in the subsection C, for instance, and yet can nevertheless have a purely monolithic structure externally.

FIG. 5 is a longitudinal section which once again shows the conditions in the honeycomb body. Smooth sheets are represented by solid lines and corrugated sheets are represented by diagonal shading in FIG. 5, although this manner of illustration does not precisely define the locations at which the corrugated sheets are intersected. However, the shading is intended to illustrate the corrugation height of the various corrugated sheets. The individual parts have the same reference numerals as in FIG. 1, and again it is shown that the first subsection A has the length a, the second subsection b has the length b, and the third subsection C has the length c. FIG. 5 does show a special feature from one standpoint, namely that the corrugated sheets 8 in the subsection B and the corrugated sheets 9 in the subsection C do not fill the complete width of these subsections. The corrugated sheets 8 have only a width b' and the corrugated sheets 9 have only a width c' while the smooth sheets 5 and 6 fill the entire widths b and c of the respective subsections B and C. The smooth sheets therefore serve as a stop for the corrugated sheets, so that if all of the sheets in the honeycomb body are layered so as to be flush at the right, compensation gaps 11, 12 are created which in each case aid the transition from larger to smaller channels, specifically both in view of coating with catalytically active material and in view of the later flow through the honeycomb body.

Figure 6:
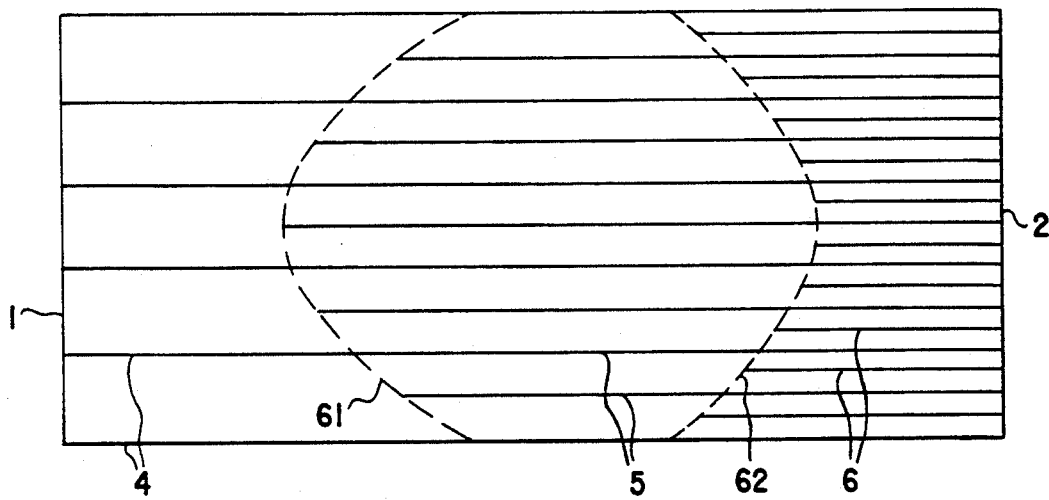

FIGS. 6 and 7 show that there are many variants for the configuration of varyingly wide smooth and corrugated sheets in a honeycomb body. In FIG. 6, boundaries 61, 62 between each two subsections in the honeycomb body are not located in a plane surface but rather extend in a parabolic fashion, for instance, in the longitudinal section which is shown. In the case of honeycomb bodies with S-shaped sheet metal layers, this leads to an overall extremely irregular boundary surface between the subsections. As mentioned above, this can have advantages in terms of noise abatement or flow distribution.

For the sake of completeness, FIG. 7 shows the possibility of increasing the number of channels only in the middle region of a honeycomb body, while keeping the number small in the end regions.

FIG. 8 is intended to explain terms "structural height" and "mean structural width". In the case of a typical corrugation, in the present case a corrugation produced by involute toothing, as is preferably used for the sheets 7, 8, 9 in the exemplary embodiments described, the structural height or amplitude h is the distance between the troughs and crests of the corrugations, while the mean structural width or frequency mb is the mean distance between the corrugation edges, in this case at half the structural height h, for instance. Analogously, corresponding heights and widths can be defined for various known structures. In the final analysis, the cross-sectional area of a honeycomb body divided by the mean structural height existing in that cross-sectional area and by the mean structural width prevailing there, yields precisely the number of channels in this cross-sectional area.

The present invention creates the basis for optimizing catalytic converters for motor vehicle exhaust systems in terms of their response performance, their thermal aging, and their structural length. It offers the possibility of eliminating unnecessary reserve volumes in constructing catalytic converters and therefore economizing on raw materials, in particular catalytically active noble metals.

We claim:

1. A honeycomb body, comprising:
  leading and trailing end surfaces being mutually spaced apart in a given flow direction;
  subsections disposed in succession in said given flow direction between said end surfaces;
  sheet-metal layers at least some of which having structures forming channels therebetween extending approximately in said given flow direction through which a fluid can flow;
  said channels having dimensions determined by said structures of said sheet-metal layers;
  each of said subsections having a different number of said channels per unit of cross-sectional area and said channels having cross-sectional areas differing in each of said subsections;
  said sheet-metal layers including some at least substantially smooth layers having spacings therebetween and extending from said leading to said trailing end surfaces giving the honeycomb body a monolithic form, and said sheet-metal layers including different numbers of other sheet-metal layers filling said spacings in each of said subsections.

2. The honeycomb body according to claim 1, wherein said at least substantially smooth layers are slightly structured in proportion to the dimensions of said channels.

3. The honeycomb body according to claim 1, wherein said sheet-metal layers include additional at least substantially smooth layers each extending only partly between said end surfaces.

4. The honeycomb body according to claim 1, wherein said sheet-metal layers include at least two types of different sheet-metal layers being highly structured approximately parallel to said given flow direction and having structural heights and mean structural widths corresponding to the dimensions of said channels, each extending over only one of said subsections.

5. The honeycomb body according to claim 4, wherein said different highly structured sheet-metal layers are corrugated sheets having a varying structural height.

6. The honeycomb body according to claim 4, wherein said different highly structured sheet-metal layers are trapezoidal sheets having a varying structural height.

7. The honeycomb body according to claim 4, wherein said different highly structured sheet-metal layers are bent in a zig-zag fashion and have a varying structural height.

8. The honeycomb body according to claim 4, wherein said different highly structured sheets each have different structural heights in a proportion of approximately 1:2.

9. The honeycomb body according to claim 4, wherein said different highly structured sheets each have different structural heights in a proportion of approximately 1:3.

10. The honeycomb body according to claim 4, wherein said different highly structured sheets each have different structural heights in a proportion of approximately 1:4.

11. The honeycomb body according to claim 4, wherein said different highly structured sheets have the same structural height and a different mean structural width.

12. The honeycomb body according to claim 1, wherein said sheet-metal layers include:
  one highly structured sheet-metal layer with a structural height corresponding to said spacings between said at least substantially smooth layers, said one highly structured sheet-metal layer being disposed between each two of said at least substantially smooth layers in one of said subsections; and
  at least two highly structured sheet-metal layers with a combined structural height corresponding to said spacings between said at least substantially smooth layers, said at least two highly structured sheet-metal layers being disposed between each two of said at least substantially smooth layers in others of said subsections.

13. The honeycomb body according to claim 12, wherein said at least two highly structured sheet-metal layers include two layers in one of said others of said subsections and more than two layers in another of said others of said subsections.

14. The honeycomb body according to claim 12, wherein said at least two highly structured sheet-metal layers are separated from one another by some of said at least substantially smooth sheet-metal layers.

15. The honeycomb body according to claim 13, wherein said at least two highly structured sheet-metal layers are separated from one another by some of said at least substantially smooth sheet-metal layers.

16. The honeycomb body according to claim 4, wherein said at least substantially smooth layers in said subsections have a given dimension, and said highly structured sheets in at least one of said subsections are narrower than said given dimension, defining compensation gaps in a transitional region between said subsections.

17. The honeycomb body according to claim 1, wherein said subsections include between two and three subsections being disposed one after the other in said given flow direction and having a different number of channels per unit of surface area.

18. The honeycomb body according to claim 17, wherein said subsections include a first subsection with from 50 to 100 channels per square inch (cpsi), a second subsection with from 100 to 200 cpsi, and a third subsection with 200 to 500 cpsi.

19. The honeycomb body according to claim 1, wherein the number of said sheet-metal layers and the number of said channels per unit of cross-sectional area increases as seen in said given flow direction.

20. The honeycomb body according to claim 1, wherein the number of said sheet-metal layers and the number of said channels per unit of cross-sectional area decreases as seen in said given flow direction.

21. The honeycomb body according to claim 1, wherein the number of said sheet-metal layers and the number of said channels per unit of cross-sectional area first increases and then decreases as seen in said given flow direction.

22. The honeycomb body according to claim 1, wherein said sheet-metal layers have an approximately S-shaped cross section.

23. The honeycomb body according to claim 1, wherein said sheet-metal layers include alternatingly disposed smooth sheets and corrugated sheets, and said corrugated sheets have at least two different corrugation heights.

24. The honeycomb body according to claim 1, wherein said sheet-metal layers include alternatingly disposed smooth sheets and corrugated sheets, and said corrugated sheets have at least two different mean corrugation widths.

25. The honeycomb body according to claim 1, wherein said sheet-metal layers include alternatingly disposed smooth sheets and corrugated sheets, and said corrugated sheets have at least two different corrugation heights and mean corrugation widths.

26. The honeycomb body according to claim 1, wherein each two of said subsections have a curved boundary therebetween, and said channels in each of said subsections have different lengths.

* * * * *